United States Patent [19]

Kashiwagi et al.

[11] Patent Number: 4,496,117
[45] Date of Patent: Jan. 29, 1985

[54] WEB TRANSPORT DEVICE

[75] Inventors: Kazuo Kashiwagi, Tokyo; Masanari Shirai, Chigasaki, both of Japan

[73] Assignee: Canon Kabushiki Kaisha, Tokyo, Japan

[21] Appl. No.: 545,924

[22] Filed: Oct. 27, 1983

[30] Foreign Application Priority Data

Nov. 1, 1982 [JP] Japan ............................... 57-192189
Nov. 1, 1982 [JP] Japan ............................... 57-192190

[51] Int. Cl.³ .................... B65H 59/38; G03B 1/02; G11B 15/13
[52] U.S. Cl. .......................... 242/191; 318/7; 318/603
[58] Field of Search ............... 242/201–205, 242/191, 186; 318/6, 7, 67, 69, 603; 360/72, 73

[56] References Cited

U.S. PATENT DOCUMENTS

| | | | |
|---|---|---|---|
| 3,564,219 | 2/1971 | Mutziger | 377/24 |
| 3,834,648 | 9/1974 | Rose et al. | 242/186 |
| 4,160,195 | 7/1979 | Sakamoto | 318/7 |
| 4,172,231 | 10/1979 | de Costemore d'Arc | 318/7 |

*Primary Examiner*—Leonard D. Christian

[57] ABSTRACT

A web transport device for transporting a web wound on a rotary member to another rotary member, provided with a first calculating unit for calculating the ratio of rotating speeds of the unwinding and winding rotary members at a regular interval, a second calculating unit for calculating the ratio of rotating speeds of the unwinding and winding rotary members at the end of web transport on the basis of the value calculated by the first calculating unit at the start of web transport, and a unit for controlling the rotation of the rotary members through the comparison of the values calculated by the first and second calculating units, respectively.

6 Claims, 8 Drawing Figures

WEB TRANSPORT DEVICE

BACKGROUND OF THE INVENTION

1. Field of the Invention

The present invention relates to a web transport device for transporting a continuous web such as a film or a tape wound on a rotary member to another rotary member in an automatic manner, and more particularly such web transport device capable of controlling the web transport when the web wound on the rotary member at the unwinding side is near its the end.

2. Description of the Prior Art

In a conventional web transport device for transporting a continuous web such as film wound on an unwinding rotary member to another winding rotary member such as a reel by driving said winding rotary member, there may result a web breakage, a failure in the driving system, an overheating of the motor if the web is fixed at the trailing end thereof on the unwinding rotary member and is transported at a high speed to said trailing end. On the other hand, if said trailing end is not fixed on the unwinding rotary member, the trailing end often becomes detached from the unwinding rotary member and the entire web is eventually transferred onto the winding rotary member, so that said trailing end has to be fixed again on said unwinding rotary member in case the web is to be returned to said unwinding rotary member.

In order to overcome such inconvenience, there has been proposed a method of attaching a special mark on the web in the vicinity of said trailing end and providing detecting means such as a microswitch for detecting said mark, wherein the web transport is terminated when said detecting means detects said mark on the web.

Such method however leads to an increased production cost because of an additional manufacturing step for attaching said special mark to the web and of the use of additional detecting means, and requires the use of a long trailer tape at the end of the web since said mark has to be positioned considerably in front of the web end in consideration of the time required from the mark detection to the web stopping. Also the web is often damaged by said detecting means, which is in most cases composed of mechanical means such as a microswitch achieving said mark detection through contact with the web. Furthermore said method is not applicable to a web not provided with said mark.

SUMMARY OF THE INVENTION

An object of the present invention is to avoid the above-mentioned drawbacks.

Another object of the present invention is to provide a web transport device capable of controlling the web transport by detecting the fact that the web has been transported close to the trailing end, without the use of a mark or similar means on the web.

Still another object of the present invention is to provide a web transport device capable of preventing web breakage, damage to the driving system or separation of the trailing end of the web from the rotary member.

Still another object of the present invention is to provide a web transport device capable of detecting the trailing end of the web without contact therewith.

Still another object of the present invention is to provide a web transport device capable of controlling the web transport by reliably detecting the trailing end of the web regardless of the kind or speed of the web.

Still another object of the present invention is to provide a web transport device capable of easily detecting the trailing end of the web by meansuring the rotating speed of the rotary members.

The present invention is applicable to various webs such as microfilm, magnetic tape or 8-mm movie film.

DETAILED DESCRIPTION OF THE PREFERRED EMBODIMENTS

Now the present invention will be clarified in detail by embodiments thereof shown in the attached drawings.

Figure 1:
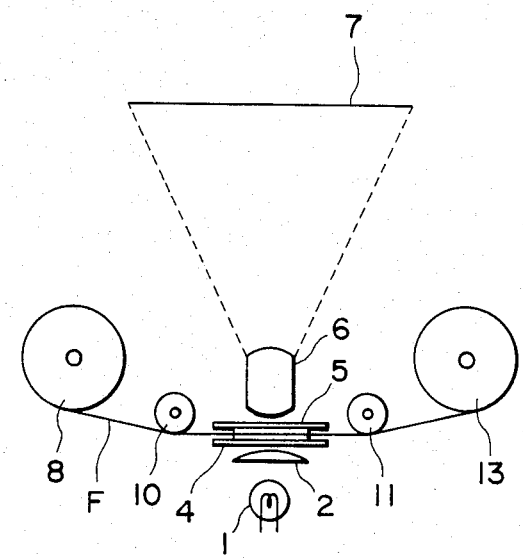
FIG. 1 is a schematic view of a microfilm reader embodying the present invention.

FIG. 1 shows a microfilm reader utilizing a web transport device of the present invention, wherein illuminating means composed of an illuminating lamp 1 and a condenser lens 2 illuminates an image recorded on a microfilm F, which will hereinafter be referred to simply as film. Film guide plates 4, 5 composed of transparent glass plates are retracted from the film path during the film transport but move toward said path when the film is stopped, thereby supporting the film in planar form at a determined focal point position. Said film guide plates are moved for example by already known solenoids. There are also shown a projecting lens 6 for projecting the image on the microfilm in an enlarged size; a screen 7 for observing the enlarged image; a feeding or unwinding reel 8 on which the microfilm F is wound; film guide rollers 10, 11; and a take-up or winding reel 13 for winding said film F.

Figure 3:
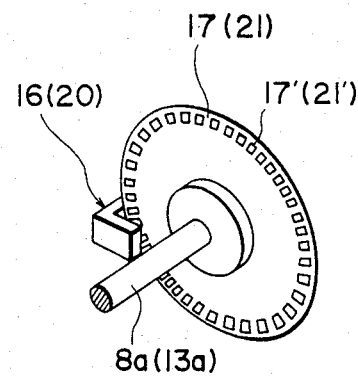
FIG. 3 is a partial view of a pulse generator.
Figure 2:
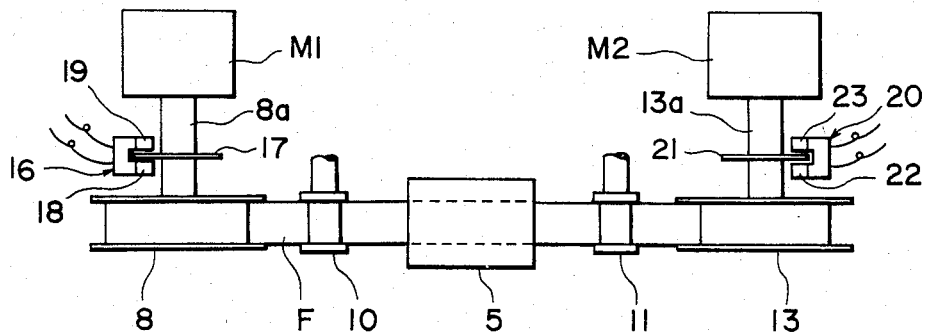
FIG. 2 is a schematic view of a film transport device employed in said reader.

FIG. 2 shows a film transport device employed in the reader shown in FIG. 1, wherein motors M1, M2 rotating in a fixed direction are respectively connected to a shaft 8a of the unwinding reel 8 and a shaft 13a of the winding reel 13, so that the film F is transported from the reel 8 to the reel 13 or in the opposite direction by selectively activating either motor. When the motor is turned off an unrepresented braking mechanism is activated to terminate the rotation of the shaft, thereby stopping the film F. Each reel is detachable from the shaft and rotates therewith. A first pulse generator 16 for generating electric signals corresponding to the rotating speed of the shaft 8a, is composed of a disk 17 fixed to the shaft 8a, and a light source 18 composed of a light-emitting diode and a photoelectric converting element 19 which are positioned across said disk 17, thus generating pulse signals of a frequency proportional to the rotating speed of the unwinding reel 8. As shown in FIG. 3, the disk 17 is provided with plural slits 17′ at regular intervals along the periphery and rotates integrally with the shaft 8a by the motor M1, whereby the light from the light source 18 intermittently enters the photoelectric converting element 19 to generate pulse signals therefrom. The motor M1 rotates in a direction to wind the film on the unwinding reel 8 mounted on the shaft 8a. A second pulse generator 20 for generating electric pulses corresponding to the rotation of the shaft 13a is constructed similarly to the first pulse generator 16 shown in FIG. 3 and is composed of a disk 21, a light source 22 and a photoelectric converting element 23, thus generating pulse signals of a frequency proportional to the rotating speed of the winding reel 13. The motor M2 rotates in a direction to wind the film on the winding reel 13.

Figure 4:
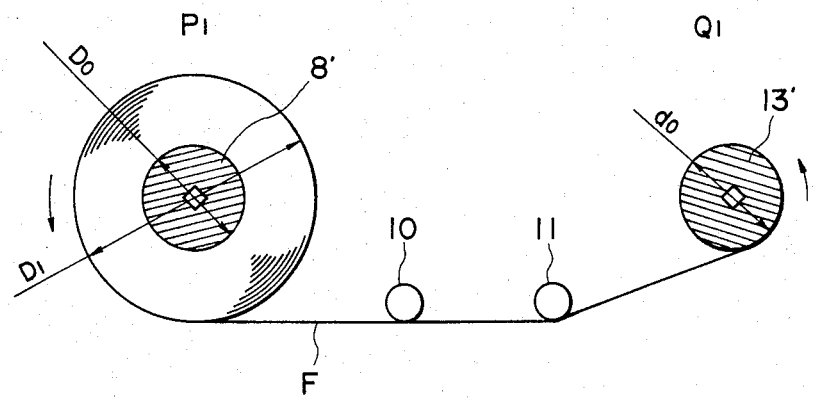
FIGS. 4 and 5 are schematic views showing the change with the progress of the film transport.
Figure 5:
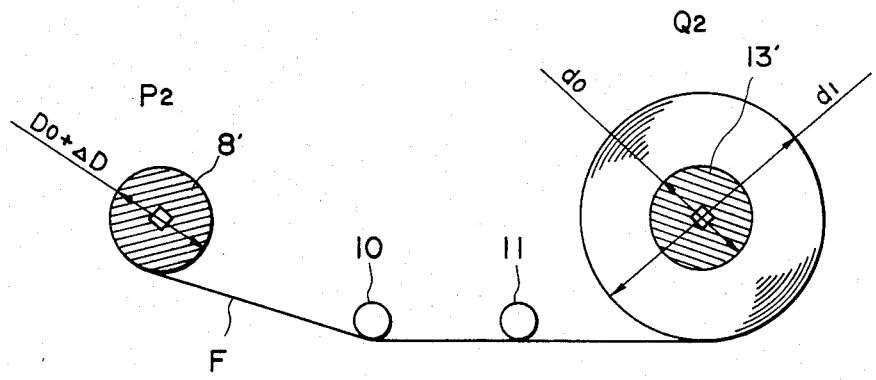

FIG. 4 schematically shows the state of the film and the reel at the start of film transport wherein the leading end portion of the film is wound, by a few turns, on the winding reel 13', while FIG. 5 schematically shows the state of the film and the reels at the end of film transport wherein the trailing end portion of the film is wound, by a few turns, on the unwinding reel 8'. In these figures the reel 8' corresponds to the core of the unwinding reel 8 shown in FIG. 1, while the reel 13' corresponds to the core of the winding reel 13 likewise shown in FIG. 1. There are further shown the aforementioned film guide rollers 10 and 11.

Figure 6:
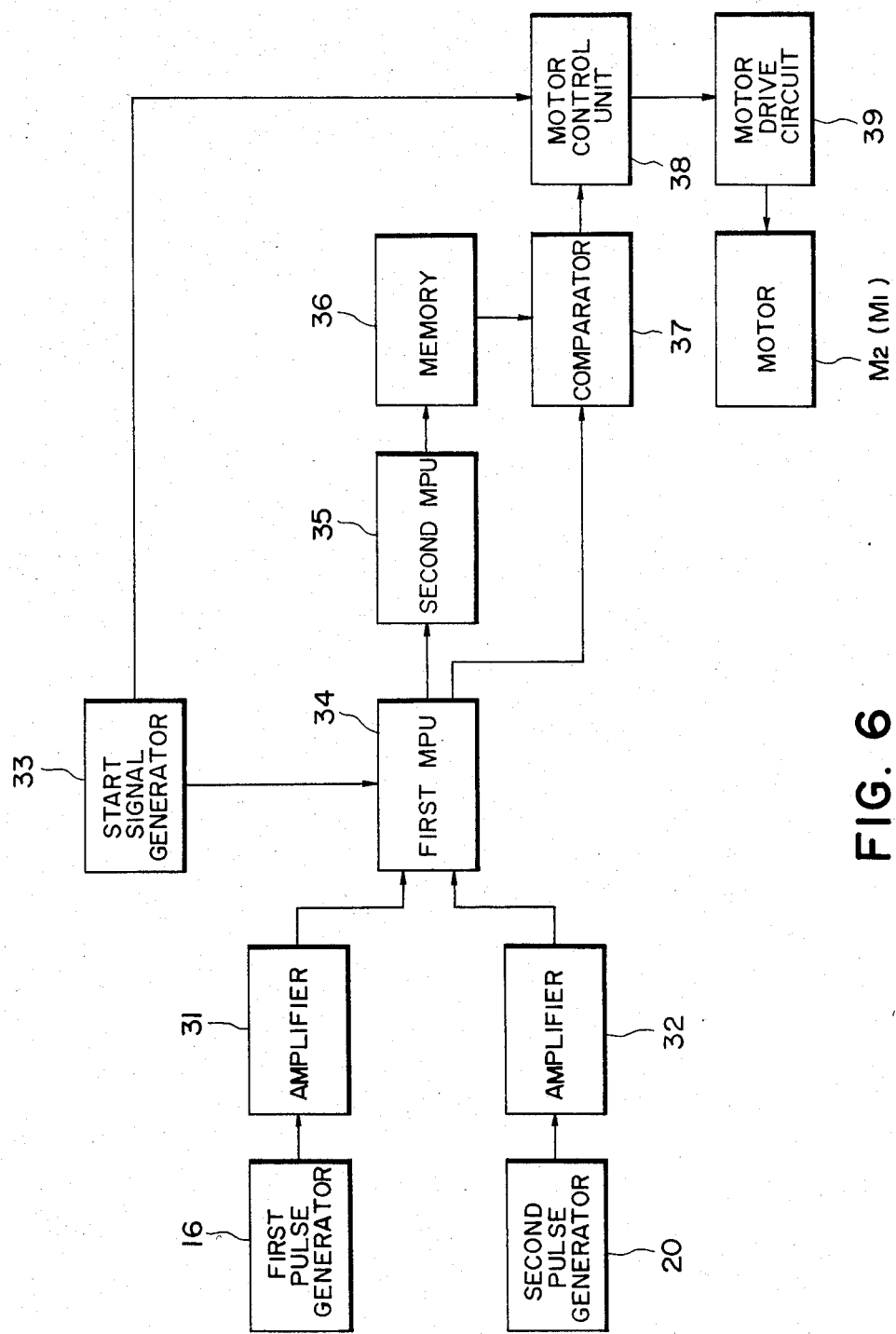
FIG. 6 is a block diagram of a film transport control circuit for use in said reader.

FIG. 6 is a block diagram of an embodiment of a control circuit for the above-described film transport device, where the first and second pulse generators 16 and 20 already explained in relation to FIGS. 2 and 3 supply pulse signals, respectively, through amplifiers 31 and 32 to a first microprocessing unit (MPU) 34, which, in response to a start signal supplied from a start signal generator 33 at the start of film transport, calculates the ratio of the number of pulses per unit time T supplied from said pulse generator 16, 20, corresponding to the ratio of rotating speeds of the reels. A second microprocessing unit 35 predicts the ratio of the pulse numbers or of the rotating speeds at the end of film transport from the pulse number ratio at the start of film transport supplied from said first MPU 34 and from other predetermined data. A comparator 37 receives the pulse number ratio calculated in said second MPU 35 through a memory 36 as a reference signal, and compares the pulse number ratio calculated in succession in the first MPU 34 with said reference signal, generating a transport end signal when the ratio calculated by the first MPU 34 coincides with the ratio stored in the memory 36. In response to said transport end signal from the comparator 37, a motor control circuit 38 supplies a control signal to a motor driving circuit 39 for decelerating or stopping a motor, which is the motor M2 if the film F is transported from the unwinding reel 8 to the winding reel 13, or the motor M1 if the film F is transported in the opposite direction.

Figure 7:
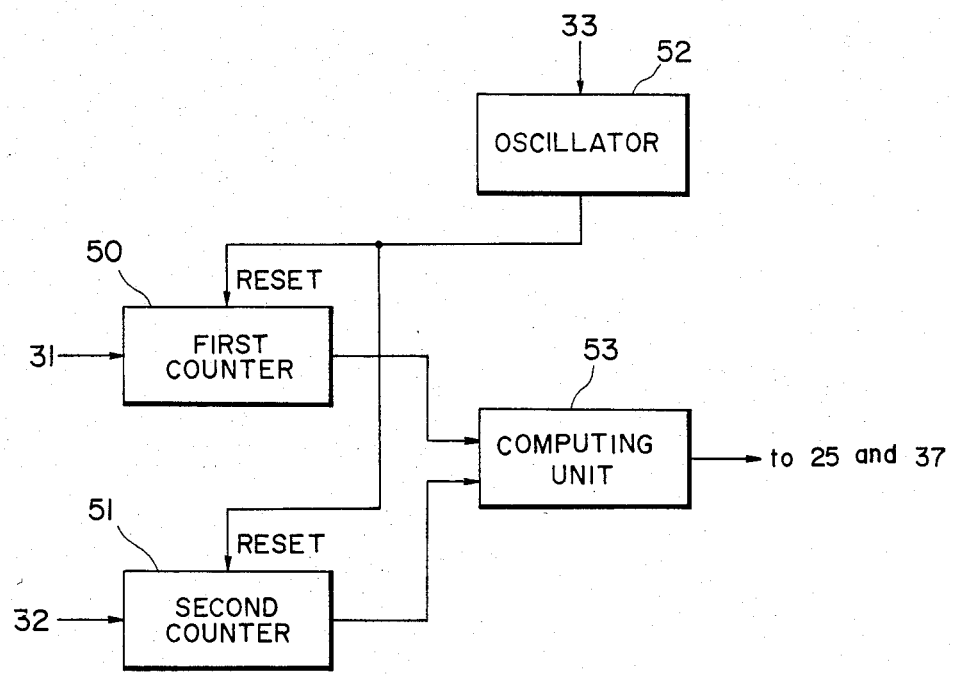
FIG. 7 is a block diagram of a first calculating unit.

FIG. 7 shows an embodiment of the first MPU 34, comprising are a first counter 50 for counting the pulse signals supplied from the amplifier 31; a second counter 51 for counting the pulse signals from the amplifier 32; an oscillator 52 for generating a pulse of a determined duration T in response to a start signal supplied from the start signal generator 33; a computing unit 53 for calculating the ratio of the pulses counted by the first and second counters 50, 51 during the period T; and an oscillator 52 for supplying pulses of a determined interval to the first and second counters 50, 51. When a pulse is received from the oscillator 52, the first and second counters 50, 51 are reset by the rising of the pulse to the initial state for starting the pulse counting, and, at the end of said pulse, the counts of the counters 50, 51 are supplied to the computing unit 53 for calculating the ratio of the pulses counted within a determined time T. After said end of the pulse, the oscillator 52 again releases another pulse to repeat the above-described procedure, thereby calculating the pulse ratio at a regular interval.

Now there will be given an explanation on the function of the web transport device while making reference to FIGS. 1 to 6. FIG. 4 shows a state prior to the start of film transport, where the film F is wound with a diameter D1 on the core 8' of a diameter D0 of the unwinding reel 8. The film is also wound a few turns on the core 13' of a diameter d0 of the reel 13, so that the diameter including said film is substantially equal to d0. From this state the motor M2 is activated to rotate the reel 13 through the shaft 13a, thereby extracting the film from the unwinding reel 8 and taking it up on the winding reel 13. At the start of film transport, the disks 17, 21 rotate together with the shafts 8a, 13a to generate pulse signals proportional to the rotating speed of said disks by means of the light sources 18, 22 and the photoelectric converting elements 19, 23. Thus, the relation between the pulse numbers and the film diameter at the start of film transport is defined by:

$$\frac{D1}{d0} = \frac{Q1}{P1} \text{ or } D1 = \frac{Q1}{P1} d0$$

wherein P1 stands for the number of pulses released by the first pulse generator 16 per unit time T, and Q1 stands for the number of pulses released by the second pulse generator 20. By substitution with $Q1/P1 = n0$ there is obtained:

$$D1 = n0 \cdot d0 \qquad (1)$$

When the film transport progresses almost to the trailing end of the film F as shown in FIG. 5, wherein the film diameter on the unwinding core 8' is equal to $D0 + \Delta D$ ($\Delta D$ represents a small value), corresponding to a few turns of the film on said core 8', while the diameter of the film on the winding reel 13 is equal to d1. At said end state of the film transport, the first pulse generator 16 generates pulses of a number P2 within the time T while the second pulse generator 20 generates pulses of a number Q2 in said time. In this state the relationship between the pulse numbers and the diameters is represented by:

$$\frac{D0 + \Delta D}{d1} = \frac{Q2}{P2} \text{ or } d1 = \frac{P2}{Q2}(D0 + \Delta D) \qquad (2)$$

which can be written, by substitution $P2/Q2 = 1/n1$, as:

$$d1 = \frac{(D0 + \Delta D)}{n1} \qquad (3)$$

the length of the film wound on the cores 8' and 13' in FIG. 4 is equal to that wound on said cores in FIG. 5. Thus, by representing the quantity of the film with the cross section, there is obtained:

$$\frac{\pi}{4}(D1^2 - D0^2) = \frac{\pi}{4}(d1^2 - d0^2) + \frac{\pi}{4}[(D0 + \Delta D)^2 - D0^2] \qquad (4)$$

Since $\Delta D$ is nearly equal to zero, the equation (4) can be rewritten as:

$$D1^2 - D0^2 = d1^2 - d0^2 + 2\Delta D \cdot D0.$$

By introducing the equations (1) and (3) into the equation (4), n1 is obtained as:

$$n1 = \frac{D0 + \Delta D}{\sqrt{(n0 \, d0)^2 + d0^2 - 2\Delta D - D0^2}} \qquad (5)$$

The quantities d0 and D0 are already known, and $\Delta D$ represents the thickness of the film wound on the core 8' at the end state of film transport. If said value $\Delta D$ is selected corresponding to a state in which the film is extracted from the unwinding reel 8 close to the trailing end, only leaving a few turns on the core 8', it is possible to predict the ratio n1 of the pulse numbers at the end of film transport from the pulse ratio n0 at the start of film transport through the equation (5), and therefore to identify the end state of film transport when the ratio of pulse numbers per unit time obtained in succession in the course of film transport becomes equal to said ratio n0. Stated differently, the output from the first computing unit 34 becomes equal to n1 when the film is extracted from the unwinding reel 8 almost to the trailing end.

In the circuit shown in FIG. 6, the second computing unit 35 stores the diameter D0 of the core 8' of the unwinding reel 8, diameter d0 of the core 13' of the winding reel 13, and predetermined winding thickness $\Delta D$ of the film F on the core 8' at the end state of film transport. In response to an instruction for film transport to be given by the operator, the motor M2 is activated to rotate the cores 8', 13' of the unwinding and winding reels 8, 13 in a direction shown in FIG. 4, whereby the film F is transported from the unwinding reel 8 to the winding reel 13.

At said start state of film transport, in response to a start signal supplied from the start signal generator 33, the first computing unit counts the pulses supplied from the first and second pulse generators 16, 20 respectively through the amplifiers 31, 32 during the time T, calculates the ratio n0 of those pulse counts and supplies said ratio n0 to the second computing unit 35. The second computing unit 35 calculates the predicted ratio n1 of the pulse numbers per unit time T from the first and second pulse generators 16, 20 at the end state of film transport from the above-mentioned ratio n0 and from the previously entered data D0, d0, $\Delta D$ according to the equation (5), and stores said predicted ratio n1 in the memory 36. In the course of film transport the pulses generated from the first and second pulse generators 16, 20 are supplied, respectively, through the amplifier 31, 32, to the first computing unit 34, which calculates the ratio of the number of pulses generated by the second pulse generator 20 within the unit time T to that generated by the first pulse generator 16 is said period T and supplies the result of said calculation in succession to the comparator 37. Said comparator 37 compares the thus entered signal with the reference signal stored in the memory 36 corresponding to the predicted pulse ratio n1 at the end state of film transport and generates a film transport end signal when two signals mutually coincide. The quantities of film on the cores 8', 13' at said end state are shown in FIG. 5. Said film transport end signal is supplied to the motor control circuit 38 for controlling the motor driving circuit 39, thereby decelerating or stopping the motor M2. In case the motor M2 is decelerated, and if the trailing end of the film is fixed to the core 8', the operator may turn off a not-shown power switch for said motor M2, or the motor M2 may be stopped after the film is taken up on the winding core 13' until the unwinding core 8' is exposed. In such case the danger of film breakage is avoided since the motor M2 is running at a low speed. On the other hand, if the trailing end of the film is not fixed on the core, film detachment from the core can be prevented if the power switch is turned off before the core 8' becomes exposed.

In the foregoing embodiment the pulse generators operate in optical manner, but pulse generation may be achieved by a magnetic or mechanical method. Also the foregoing explanation is limited to the case of film transport from the unwinding reel to the winding reel, but film transport without breakage or detachment from the core is possible also in the reverse film motion from the winding reel to the unwinding reel through the use of a similar structure and similar functions.

In the foregoing embodiment the film deceleration or stoppage takes place when the signal from the first computing unit 34 coincides with that of the second computing unit 35, but it is also possible to decelerate or to stop the film when the signal from the first computing unit 34 becomes close to that of the second computing unit 35.

Figure 8:
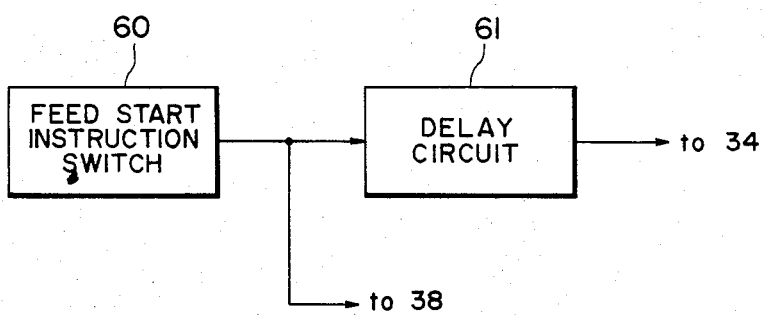
FIG. 8 is a block diagram of a start signal generator.

FIG. 8 shows an embodiment of the start signal generator 33 comprising a transport instruction switch 60 and a delay circuit 61. Said switch 60 releases, upon actuation by the operator, a drive start signal to the delay circuit 61 and to the motor driving circuit 39. In response to said signal the motor driving circuit 39 activates the motor M2, whereby the winding reel 13 starts to rotate and transports the film from the unwinding reel 8 to the winding reel 13.

On the other hand, after the lapse of a determined time from said drive start signal, the delay circuit 61 releases a start signal for causing the first computing unit 34 to start the calculation. The delay time of said delay circuit 61 is selected equal to the time required by the motor M2 to reach a determined rotating speed after the activation thereof, whereby the first computing unit 34 starts the calculating operation after the reels 8, 13 reach determined rotating speeds.

The leading end of the film is manually or automatically fixed to the winding reel, and the calculating operation of the first computing unit 34 is started only after said leading end is securely wound on the winding reel.

The film may be automatically reversed when the film transport is stopped at the end state thereof. This is achieved by activating the motor M1 through the motor control circuit 38 when the motor M2 is deactivated by the transport end signal from the comparator 37.

What we claim is:

1. A web transport device for transporting a web wound on an unwinding rotary member to a winding rotary member by the rotation thereof, comprising:
   measuring means for measuring the rotating speed of the unwinding rotary member and of the winding rotary member;
   first computing means for calculating the ratio of the rotating speed of the unwinding rotary member and of the winding rotary member within a predetermined period in the course of web transport;
   second computing means for calculating the ratio of the rotating speeds of the unwinding rotary member and of the winding rotary member at the end of web transport on the basis of a value calculated by said first computing means at the start of web transport; and transport control means for comparing the results of calculations of said first and second computing means and controlling the drive for said rotary members in response to the result of said comparison.

2. A web transport device according to claim 1, wherein said measuring means comprises first pulse generating means for generating pulses of a frequency proportional to the rotating speed of said unwinding rotary member and second pulse generating means for generating pulses of a frequency proportional to the rotating speed of said winding rotary member, and said first computing means is adapted to calculate the ratio of the numbers of pulses generated by said first and second pulse generating means within said predetermined time period.

3. A web transport device according to claim 1, wherein said transport control means is adapted to terminate the drive of said rotary members when the results of calculation of said first and second computing means mutually coincide.

4. A web transport device according to claim 1, wherein said transport control means is adapted to decelerate the rotating speeds of said rotary members when the results of calculation of said first and second computing means mutually coincide.

5. A web transport device according to claim 1, wherein said second computing means comprises setting means for setting core diameters of said rotary members and a web thickness wound on the winding rotary member at the end of web transport, and is adapted to effect calculation according to thus set values and the result of calculation by said first computing means.

6. A web transport device for transporting a web wound on an unwinding rotary member to a winding rotary member by the rotation thereof, comprising:

first pulse generating means for generating a pulse at rotation, by a predetermined angle, of the unwinding rotary member;

second pulse generating means for generating a pulse at rotation, by a predetermined angle, of the winding rotary member;

first counting means connected with said first pulse generating means and adapted to count the pulses generated by the first pulse generating means;

second counting means connected with said second pulse generating means and adapted to count the pulses generated by the second pulse generating means;

first computing means for calculating the ratio of the numbers of pulses counted by said first and second counting means during a predetermined period;

second computing means for predicting, from the value calculated by said first computing means at the start of web transport, a value to be calculated by said first computing means at the end of web transport; and control means for comparing the values calculated by said first and second computing means and controlling the drive for said rotary members when said values mutually coincide.

* * * * *